(12) United States Patent
Kim et al.

(10) Patent No.: US 12,147,503 B2
(45) Date of Patent: Nov. 19, 2024

(54) DEBIASING TRAINING DATA BASED UPON INFORMATION SEEKING BEHAVIORS

(71) Applicant: Verizon Media Inc., New York, NY (US)

(72) Inventors: Donghyun Kim, Mountain View, CA (US); Liuqing Li, Blacksburg, VA (US); Yufeng Ma, Sunnyvale, CA (US); Yu Wang, San Jose, CA (US); Rao Shen, Sunnyvale, CA (US); Kostas Tsioutsiouliklis, Saratoga, CA (US)

(73) Assignee: Yahoo Assets LLC, New York, NY (US)

( * ) Notice: Subject to any disclaimer, the term of this patent is extended or adjusted under 35 U.S.C. 154(b) by 930 days.

(21) Appl. No.: 17/192,947

(22) Filed: Mar. 5, 2021

(65) Prior Publication Data

US 2022/0284242 A1    Sep. 8, 2022

(51) Int. Cl.
*G06N 20/00* (2019.01)
*G06F 11/34* (2006.01)
*G06F 18/21* (2023.01)
*G06F 18/2113* (2023.01)

(52) U.S. Cl.
CPC ...... *G06F 18/2163* (2023.01); *G06F 11/3438* (2013.01); *G06F 18/2113* (2023.01); *G06N 20/00* (2019.01)

(58) Field of Classification Search
None
See application file for complete search history.

(56) References Cited

U.S. PATENT DOCUMENTS

| | | | |
|---|---|---|---|
| 2012/0166946 A1* | 6/2012 | Bombolowsky | G06F 9/453 715/708 |
| 2018/0101534 A1* | 4/2018 | Alexander, Jr. | G06F 16/93 |
| 2020/0151587 A1* | 5/2020 | Ahringer | H04N 21/258 |
| 2020/0364245 A1* | 11/2020 | Sinha | G06F 3/0482 |

* cited by examiner

*Primary Examiner* — Xuyang Xia
(74) *Attorney, Agent, or Firm* — Cooper Legal Group LLC

(57) ABSTRACT

One or more computing devices, systems, and/or methods for debiasing training data based upon information seeking behaviors are provided. Users associated with a set of training data are segmented into information seeking behavior groups corresponding to varying degrees of information seeking behaviors of the users. Biases for the information seeking behavior groups may be estimated based upon information seeking behaviors of users within the information seeking behavior groups. The training set of data is debiased using the biases to generate a debiased training set of data. A model may be trained to perform a task based upon the debiased training set of data.

20 Claims, 9 Drawing Sheets

DEBIASING TRAINING DATA BASED UPON INFORMATION SEEKING BEHAVIORS

BACKGROUND

Many different service providers may utilize machine learning functionality, such as models, to perform various tasks related to services provided by the service providers. In an example, a recommendation service provider may utilize a model to predict likelihoods that users will be interested in and/or interact with certain recommendations, such as restaurant recommendations, refrigerator recommendations, videogame recommendations, etc. The model may utilize information about a user (e.g., user features) and/or a recommendation (e.g., content features) to determine a relevancy score between the user and the recommendation as an indicator of how likely the user would view and/or interact with the recommendation. In this way, available recommendations may be ranked by the model, and a recommendation with a highest rank may be provided to the user. Models may be utilized by service providers to perform other tasks, such as user related prediction tasks, content recommendation generation, user interaction prediction, user segmentation and lookalike modeling, identifying content items and/or a display order for the content items to display to a user, etc.

SUMMARY

In accordance with the present disclosure, one or more computing devices and/or methods for debiasing training data based upon information seeking behaviors are provided. A set of training data may correspond to implicit user feedback that may be indicative of whether content items are relevant to users. For example, a user may view a content item, click the content item, scroll past and ignore the content item, or may perform some action after viewing the content item such as purchasing a product. These actions or inactions by the user may be regarded as implicit user feedback as to whether the content item is relevant to the user. Various types of biases may make the implicit user feedback less reliable than explicit user feedback (e.g., a user assigning a 1 through 10 rating to a movie that the user watched). Such biases may relate to presentation bias (e.g., a user may be more likely to notice and interact with a first link to a first article than a second link to a second article because the first link has an image and the second link does not have an image), position bias (e.g., certain users may be more likely to interact with content items that are displayed more prominently such as at the top of a scrollable list than other content items displayed less prominently such as near the bottom of the scrollable list), etc. Unfortunately, individual users may be affected differently by biases, such as where a first user actively seeks out information and will scroll through content items until locating a relevant content item, and thus the first user is not affected much by position bias. In contrast, a second user that is an inactive information seeker that usually interacts with the first few displayed content items with little scrolling through other available content items may be much more affected by position bias.

Accordingly, as provided herein, the training set of data may be debiased to create a debiased set of training data that can be used to train a model to more accurately and precisely perform tasks such as outputting relevancy scores between content items and users. For example, users associated with the set of training data may be segmented into information seeking behavior groups corresponding to varying degrees of information seeking behaviors of the users. Users that browse more than a threshold number of content items before interacting with a content item may be segmented into a first information seeking behavior group corresponding to active information seeking users. Users that browse less than the threshold number of content items before interacting with a content item may be segmented into a second information seeking behavior group corresponding to inactive information seeking users. It may be appreciated that any number of information seeking groups and/or thresholds of degrees of information seeking behaviors may be implemented.

Biases, such as position biases, may be estimated for each of the information seeking behavior groups based upon information seeking behaviors of users within each of the information seeking behavior groups. The training set of data is debiased using the biases to generate a debiased training set of data. For example, the training set of data may be modified based upon position biases in order to compensate for how position biases can differently affect individual users and/or differently affect different information seeking behavior groups of users. As opposed to having a single global position bias used to debias the training set of a data that does not take into account how position biases affect different users differently, the training data set is debiased based upon multiple different position biases for different users and/or different information seeking behavior groups of users. In this way, the debiased training set of data can be used to train a model to generate a trained model that can more accurately perform tasks such as more accurately assign relevancy scores between content items and users.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
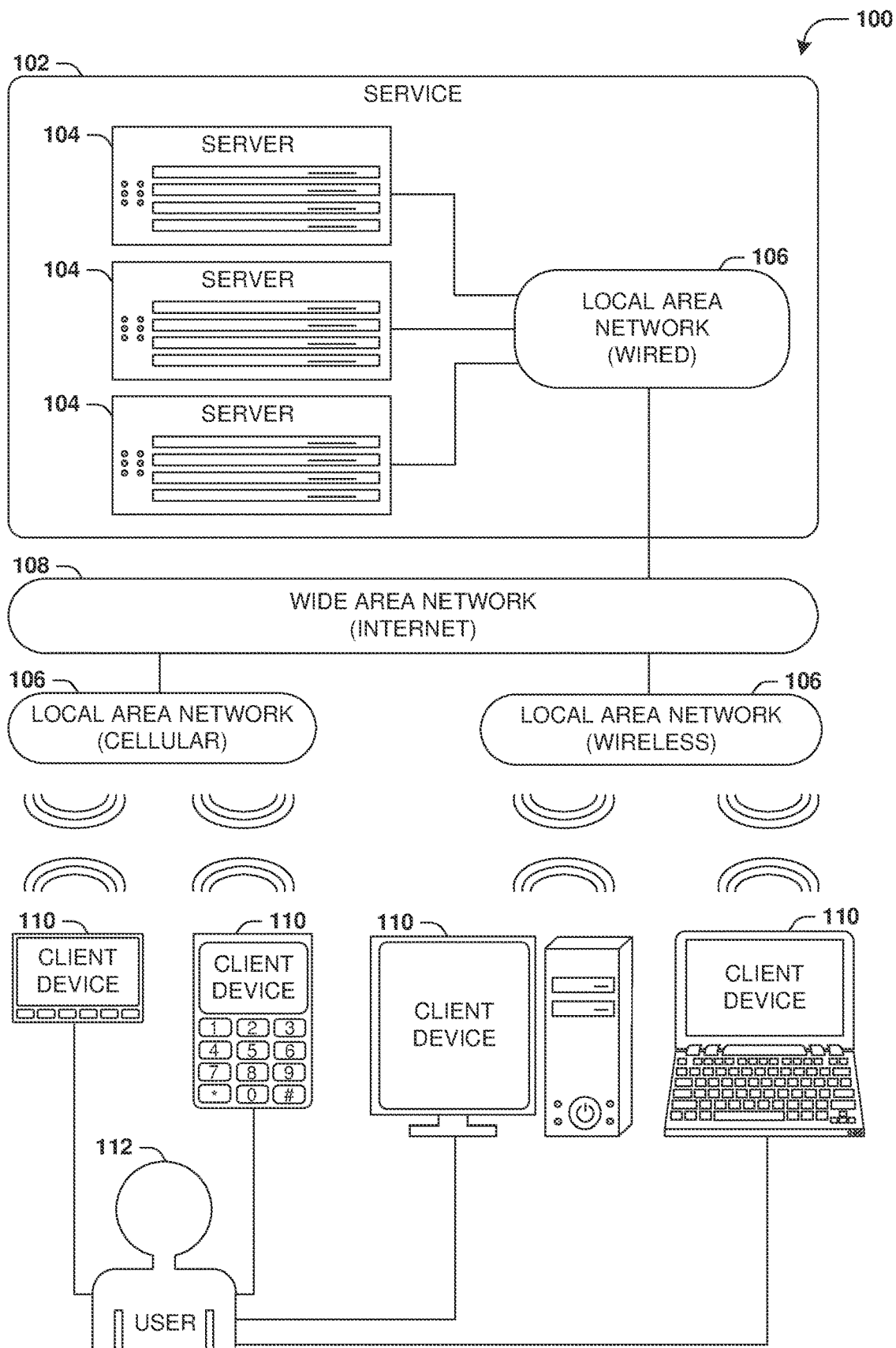
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ different architectures, may be compliant or compatible with differing protocols and/or may interoperate within the local area network 106. Additionally, a variety of local area networks 106 may be interconnected; e.g., a router may provide a link between otherwise separate and independent local area networks 106.

In scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
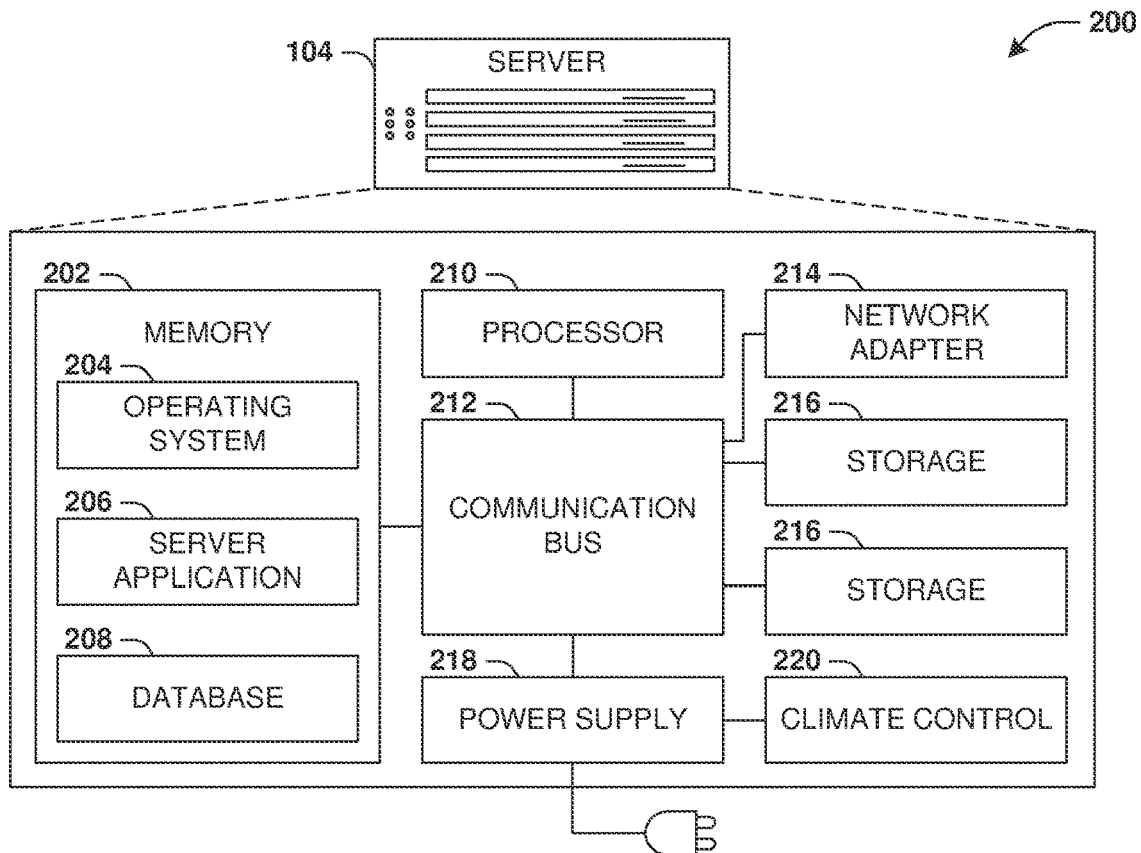
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system.

The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
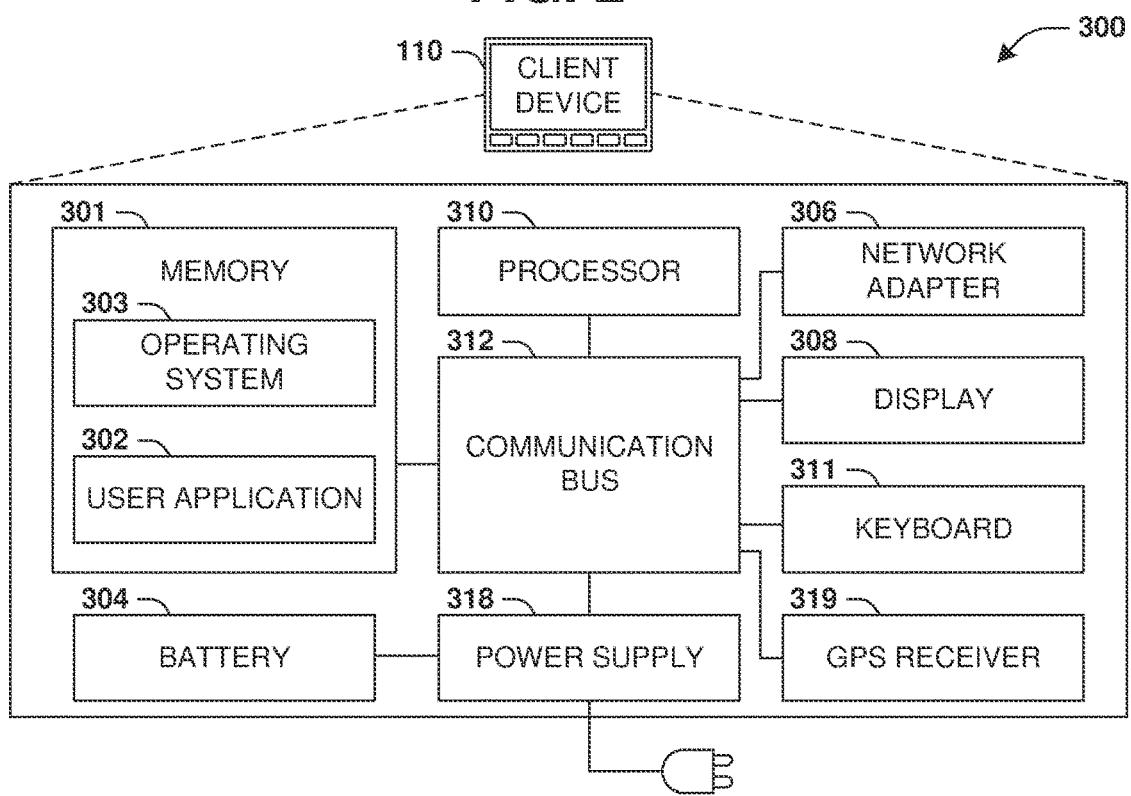
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

2. Presented Techniques

One or more systems and/or techniques for debiasing training data based upon information seeking behaviors are provided. Service providers may provide various types of services to users, such as a social network service provider, a news service provider, an email service provider, a website service provider, a content streaming service provider, an image sharing service provider, a videogame service provider, a recommendation service provider, etc. These services, such as the ability to view a social network feed, read news articles, view emails, browse a website, etc., may be accessible through websites, applications, or other user interfaces displayed on user devices. Many of these service providers may utilize machine learning algorithms, such as models, to determine what particular content items to provide to certain users accessing the services of these service providers. In an example, a news service provider may utilize a model to determine what news articles to display to a particular user and the display position order with which to display the news articles to the user. In another example, a movie streaming service may utilize a model to determine what movies to recommend to a user and the order with which to present the recommendations. In another example, a social network service provider may utilize a model to determine what social network posts to display to a user and the order with which to present the social network posts. In this way, a variety of service providers may utilize models to determine what content items may be relevant to a user, and the order with which to present the content items to the user. Content items may correspond to images, videos, songs, videogames, new articles websites, services, products, recommendations, text, links to websites, and/or a wide variety of other types of content.

Various types of training data may be used to train a model. In an example, explicit user feedback may be used to train the model. The explicit user feedback may correspond to a user explicitly indicating whether a particular content item is relevant to the user and/or how relevant, such as where the user rates a movie, a song, a purchased item, etc. However, explicit user feedback can be very sparse because users rarely give explicit user feedback in an amount that can be used to adequately train a model. Accordingly, the model may be trained with implicit user feedback, which may be more abundant and available. The implicit user feedback may correspond to whether the user viewed a content item, clicked the content item, engaged with the content item, ignored or scrolled past the content item, and/or performed an action after viewing the content item such as purchasing a product, sending an email regarding the content item, submitting a search query regarding the content item, etc. In this way, the implicit user feedback may be used to train the model to output relevancy scores between content items and users.

Once the model is deployed, a service provider may utilize the model to assign relevancy scores to available content items that could be displayed to a particular user accessing a service of the service provider. The relevancy scores may be used to rank and select certain available content items (e.g., highly relevancy content items having the highest relevancy scores) to display to the user through a user interface on a client device (e.g., a website of the service provider being displayed through a browser, a social network application of a social network service provider displayed on a mobile device, etc.). The relevancy scores may also be used to determine how to display the selected content items, such as display positions for the selected content items. For example, if the selected content items are displayed within a scrollable list, then those selected content items with the highest relevancy scores may be positioned at the top of the scrollable list at a more prominent and noticeable display position than positions at the bottom of the scrollable list that would not be seen by the user unless the user scrolls through the scrollable list towards the bottom.

Unfortunately, the implicit user feedback may not accurately represent whether a user considered a content item to be relevant or not because of various biases that reduce the accuracy of the implicit user feedback reflecting what motivated the user to ignore or interact with the content item. In an example of presentation bias, a first link and a second link to the same article may be displayed to users. Most of the users may click the second link but not the first link because the second link is associated with an image relating to the article while the first link does not have an associated image. This is an example of presentation bias where the presentation of content items can affect user engagement with the content items, as opposed to truly reflecting whether the user engaged with or ignored a content item based upon relevancy of the content item to the user. In an example of position bias, a user may be more likely to interact with a content item that is displayed more prominently (e.g., a movie recommendation displayed at the top of a list of movie recommendations that is visible to a user without having to scroll through the list of movie recommendations) than another content item (e.g., a movie recommendation displayed in the middle or end of the list of movie recommendations that would not be seen unless a user scrolls through the list of movie recommendations) that may otherwise be more relevant than the content item. Training the model using the implicit user feedback without taking into account these biases of individual users or groups of similar users will result in an inaccurate model that is unable to create precise and accurate predictions of relevancy scores indicative of how relevant content items are to users because other factors relating to the biases may have affected user engagement with the content items. Thus, irrelevant and/or annoying content items may be provided to users instead of highly relevant and engaging content items. This can result in diminished user engagement with a service provider.

Accordingly, as provided herein, a set of training data may be debiased to create a debiased set of training data that can be used to train a model to more accurately and precisely output relevancy scores of how relevant content items are to users. The ability to train the model to output more precise relevancy scores allows a service provider to more accurately select content items that may be relevant and engaging to users of the service provider in order to increase user engagement with the service provider. Additionally, the set of training data can be debiased in a manner where the debiased training data excludes personal user information, thus improving the security and privacy of users while improving the accuracy and precision of the model being trained on the debiased training data.

Figure 4:
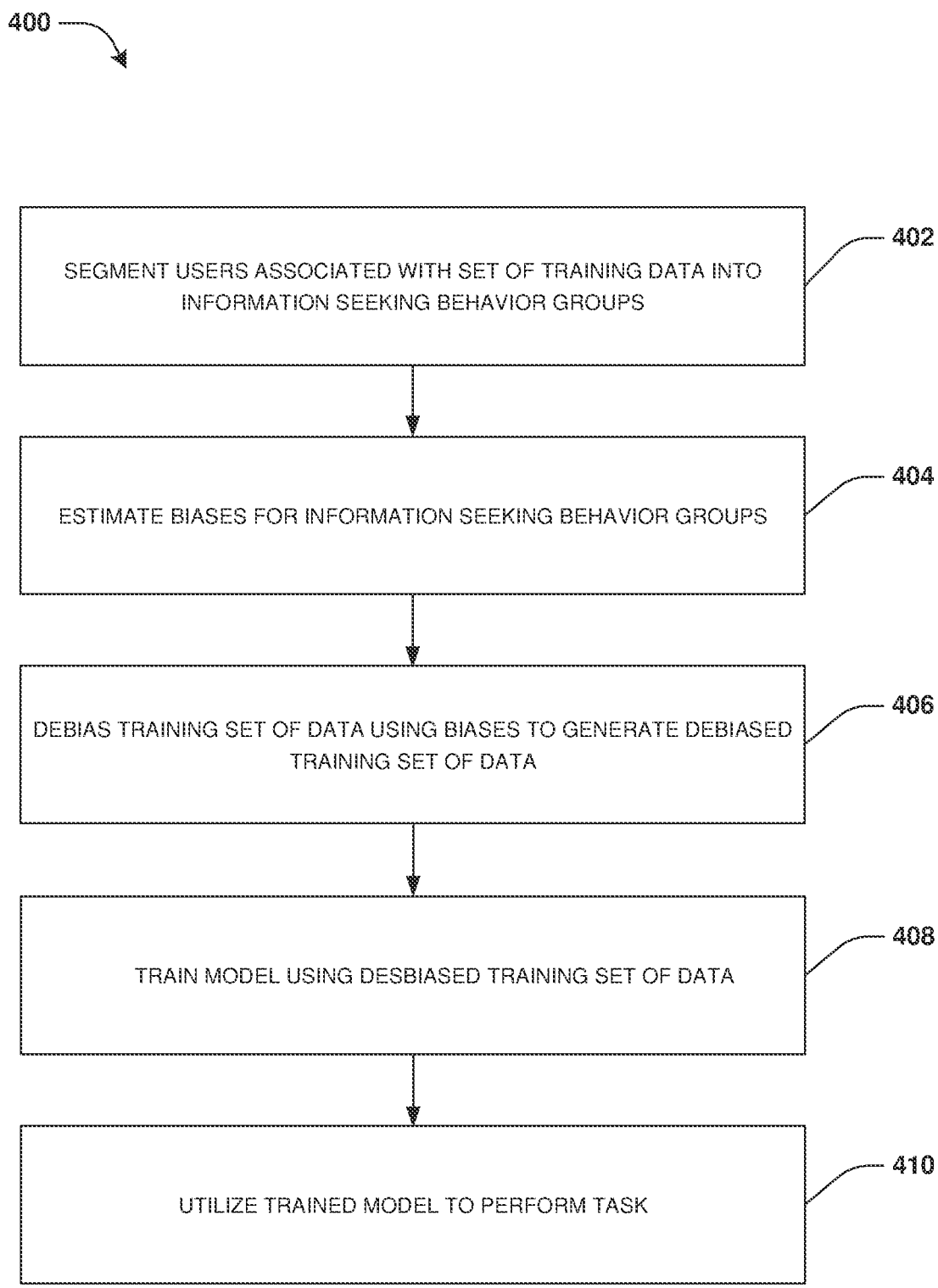
FIG. 4 is a flow chart illustrating an example method for debiasing training data based upon information seeking behaviors.
Figure 5A:
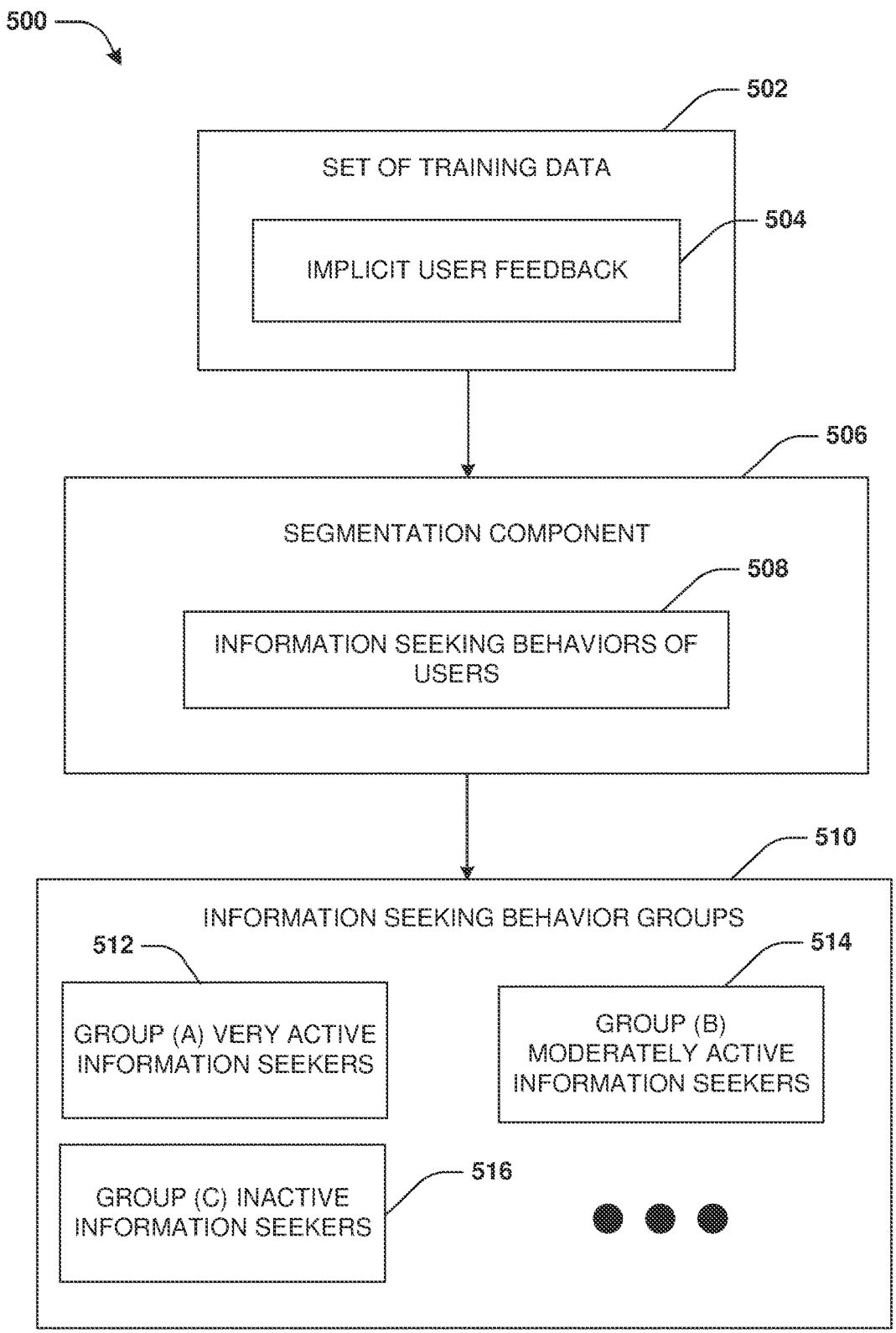
FIG. 5A is a component block diagram illustrating an example system for debiasing training data based upon information seeking behaviors, where users are segmented into information seeking behavior groups.

One embodiment of debiasing training data for training models is illustrated by an exemplary method 400 of FIG. 4 and is further described in conjunction with system 500 of FIGS. 5A-5E. A segmentation component 506 may be hosted by a computing device, a virtual machine, hardware, software, or combination thereof, as illustrated by FIG. 5A. The segmentation component 506 may be configured to retrieve a set of training data 502. In some embodiments, the set of training data 502 comprises implicit user feedback 504. The implicit user feedback 504 may correspond to whether users interacted with content items, how the users interacted with the content items, and display/click locations/positions of the content items. The content items may correspond to images, videos, songs, videogames, new articles, search results, websites, services, products, recommendations, text, links to websites, and/or a wide variety of other types of content, which may have been displayed to the users through websites, applications, social network feeds, recommendations, a television, a user interface of a computing device, a videogame console user interface, an email application, a news application, etc. The implicit user feedback 504 may indicate whether users viewed content items, disregarded or ignored content items, clicked content items, interact with content items, or performed actions after viewing content items. In some embodiments, the implicit user feedback 504 may exclude personal information about the user, such as identification information, demographic information, etc., in order to preserve the privacy and security of the users.

During operation 402 of method 400, the segmentation component 506 may segment the users associated with the set of training data 502, such as the implicit user feedback 504, into information seeking behavior groups 510 corresponding to varying degrees of information seeking behaviors 508 of the users. In an example, the information seeking behaviors 508 of the users may be derived by the segmentation component 506 from information indicating how the users browsed, viewed, and/or interacted with content items and the display locations of the content items (e.g., click position/location of a content item interacted with a user). For example, the information may be indicative of a first user tending to scroll through content items before interacting with a particular content item that is interesting to the first user, and thus the first user may be an active information seeker. The information may be indicative of a second user tending to only interact with content items display at the top most prominent display locations (e.g., content items displayed at the top of a scrollable list) and rarely scrolls through content items before interacting with a particular content item, and thus the second user may be an inactive information seeker. This information may be identified by the segmentation component 506 from click positions of content items interacted with by the users (e.g., click positions of content items interact with by the first user may vary greatly, while click positions of content items interacted with by the second user may be the first few click positions correspond to the first few displayed content items), and is used to derive the information seeking behaviors 508 of the user. Other information such as a time duration that a user views a content item may also be used by the segmentation component 506 to derive the information seeking behaviors of the user 508.

In some embodiments, the information, such as the click positions of the content items interacted with by users, may be constrained to user sessions by the segmentation component 506. A user session may correspond to a single session of a user interacting with a computing device or service provider, and/or may correspond to a particular duration of user interactions such as 30 minutes or any other time duration. Similarly, the information seeking behaviors 508 of the user may be evaluated by the segmentation component 506 accordingly to such user sessions.

In some embodiments, the segmentation component 506 may group users into a group (A) 512 of the information seeking behavior groups 510 based upon the information seeking behaviors 518 of the users. The group (A) 512 may correspond to very active information seekers. Users that browse more than a first threshold amount of content items before interacting with particular content items may be grouped into the group (A) 512 because these users are very active at seeking out information such as by scrolling through a lot of content items before finally identifying a content item of interest to interact with. This may be identified based upon the users being associated with click positions that vary greater than a first threshold amount of variance with respect to one another.

In some embodiments, the segmentation component 506 may group users into a group (B) 514 of the information seeking behavior groups 510 based upon the information seeking behaviors 508 of the users. The group (B) 514 may correspond to moderately active information seekers. Users that browse less than the first threshold amount of content items and more than a second threshold amount of content items before interacting with particular content items may be grouped into the group (B) 514 because these users are moderately active at seeking out information such as by scrolling through a some content items before finally identifying a content item of interest to interact with. This may be identified based upon the users being associated with click positions that vary less than the first threshold amount of variance but more than a second threshold amount of variance with respect to one another.

In some embodiments, the segmentation component 506 may group users into a group (C) 516 of the information seeking behavior groups 510 based upon the information seeking behaviors 508 of the users. The group (C) 516 may correspond to inactive information seekers. Users that browse less than the first threshold amount of content items and less than the second threshold amount of content items before interacting with particular content items may be grouped into the group (C) 516 because these users are inactive at seeking out information such as by merely interacting with the first few content items encountered without scrolling through other content items. This may be identified based upon the users being associated with click positions that vary less than the first threshold amount of variance and less than the second threshold amount of variance with respect to one another.

It may be appreciated that the segmentation component 506 may segment the users into any number of information seeking behavior groups at any granularity using any number of thresholds or other segmentation mechanics.

Figure 5B:
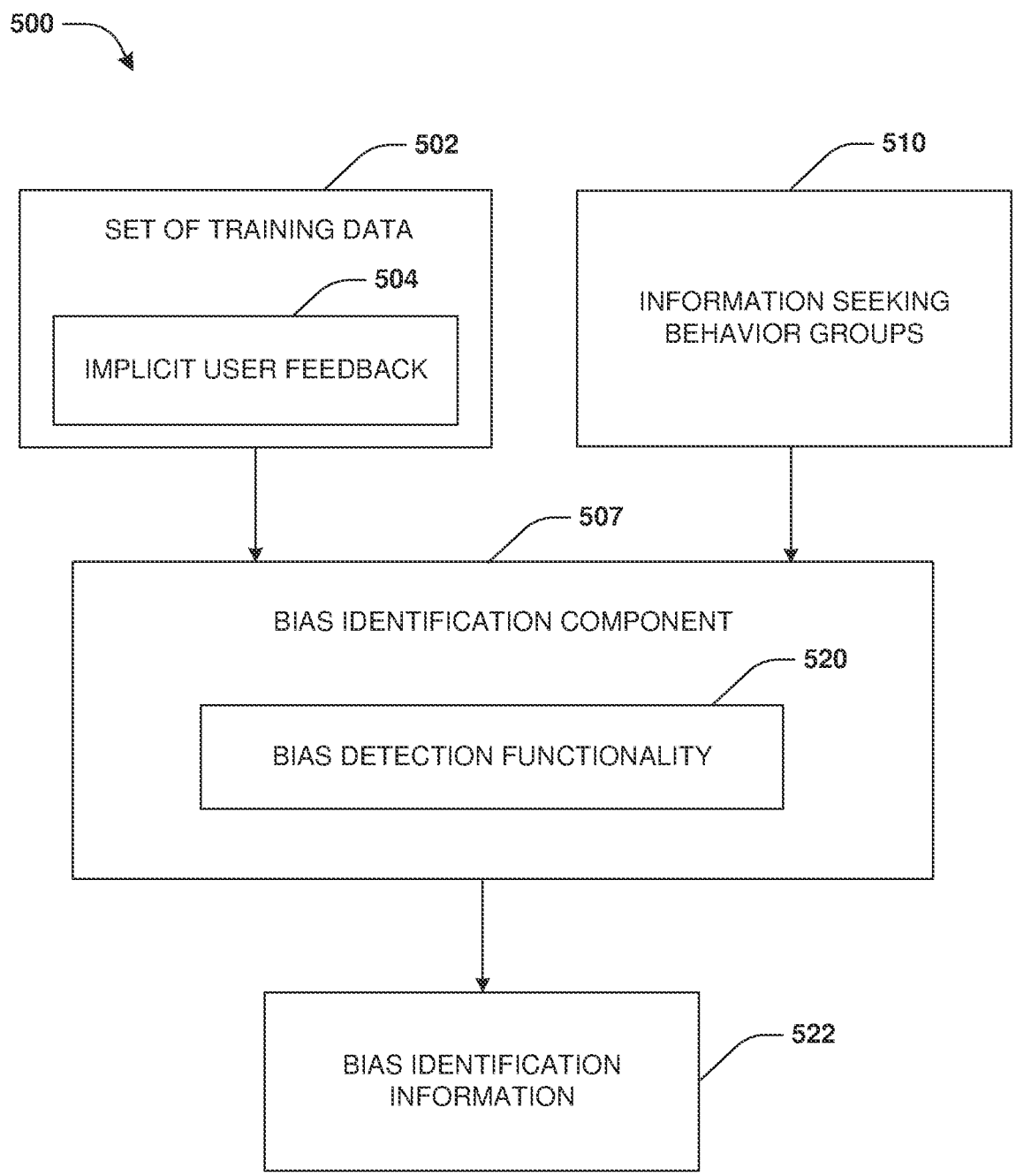
FIG. 5B is a component block diagram illustrating an example system for debiasing training data based upon information seeking behaviors, where bias identification information is identified.

During operation 404 of method 400, biases for the information seeking behavior groups 510 may be estimated by a bias identification component 507, as illustrated by FIG. 5B. The bias identification component 507 may execute bias detection functionality 520 to identify the biases based upon information seeking behaviors of the users within each information seeking behavior group of the information seeking behavior groups 510. For example, the bias identification component 507 may execute the bias detection functionality 520 to identify a first bias for the group (A) 512 of very active information seekers. In some embodiments where position biases are being identified, a first position bias for the group (A) 512 may be identified to indicate that position bias has little effect on users within the group (A) 512 because the users will scroll and actively search out content items of interest regardless of the display position at which the content items are presented to these users.

The bias identification component 507 may execute the bias detection functionality 520 to identify a second bias for the group (B) 514 of moderately active information seekers. In some embodiments where position biases are being identified, a second position bias for the group (B) 514 may be identified to indicate that position bias has a moderate effect on users within the group (B) 514 because the users will scroll some to search out content items of interest, and thus the display position/location of content items being presented more prominently has some effect because the users will do some scrolling but not exhaustive scrolling to search for relevant content items.

The bias identification component 507 may execute the bias detection functionality 520 to identify a third bias for the group (C) 516 of inactive information seekers. In some embodiments where position biases are being identified, a third position bias for the group (C) 516 may be identified to indicate that position bias has a large effect on users within the group (C) 516 because the users rarely scroll through content items and will merely interact with the first few content items displayed at prominent/top positions.

Based upon the execution of the bias detection functionality 520 by the bias identification component 507, the bias identification component 507 may output bias identification information 522. In some embodiments, the bias identification information 522 may correspond to a wide variety of different biases, such as position bias, presentation bias, prejudice bias, sample bias, measurement bias, exclusion bias, observer bias, etc.

In some embodiments, the bias identification component 507 may identify biases on a per user basis. For example, the bias identification component 507 may execute the bias detection functionality 520 to determine segmentation probabilities that each of the users belong to particular information seeking behavior groups 510. The bias identification component 507 may determine personalized position biases for each user based upon the segmentation probability of each users. The personalized position biases may be included within the bias identification information 522 for debiasing the set of training data 502.

Figure 5C:
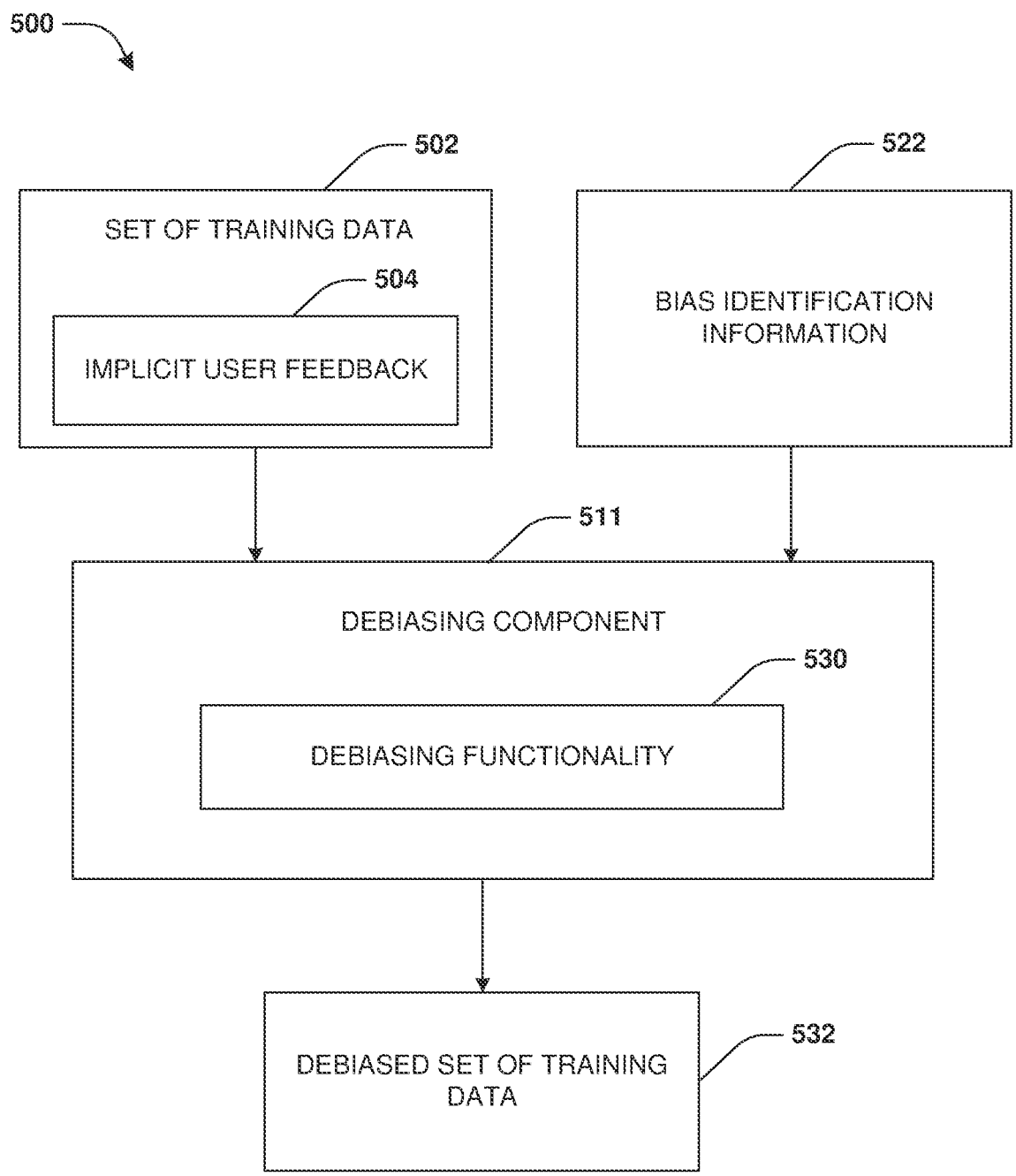
FIG. 5C is a component block diagram illustrating an example system for debiasing training data based upon information seeking behaviors, where a debiased set of training data is generated.

During operation 406 of method 400, a debiasing component 511 may debias the set of training data 502, such as the implicit user feedback 504, as illustrated by FIG. 5C. The debiasing component 511 may execute debiasing functionality 530 to debias the set of training data 502 using the bias identification information 522, such as the position biases of the information seeking behavior groups 510 of users and/or the personalized position biases for individual users. In this way, the debiasing component 511 executes the debiasing functionality 530 to use the bias identification information 522 to debias the set of training data 502 to create a debiased set of training data 532. As part of debiasing the set of training data 502, the bias identification information 522 may be used to modify the set of training data 502 in order to take into account how much position bias affects or does not affect certain users and/or information seeking behavior groups 510 of users since position bias may affect some users (e.g., inactive information seekers) more than other users (e.g., active information seekers). Without debiasing the set of training data 502, the set of training data 502 may comprise inaccurate training data points as to whether users interacted with content items because the users found the content items to be relevant or whether the users interacted with just the first few content items provided to the users regardless of how relevant the content items are to these users because the users are inactive information seekers.

Figure 5D:
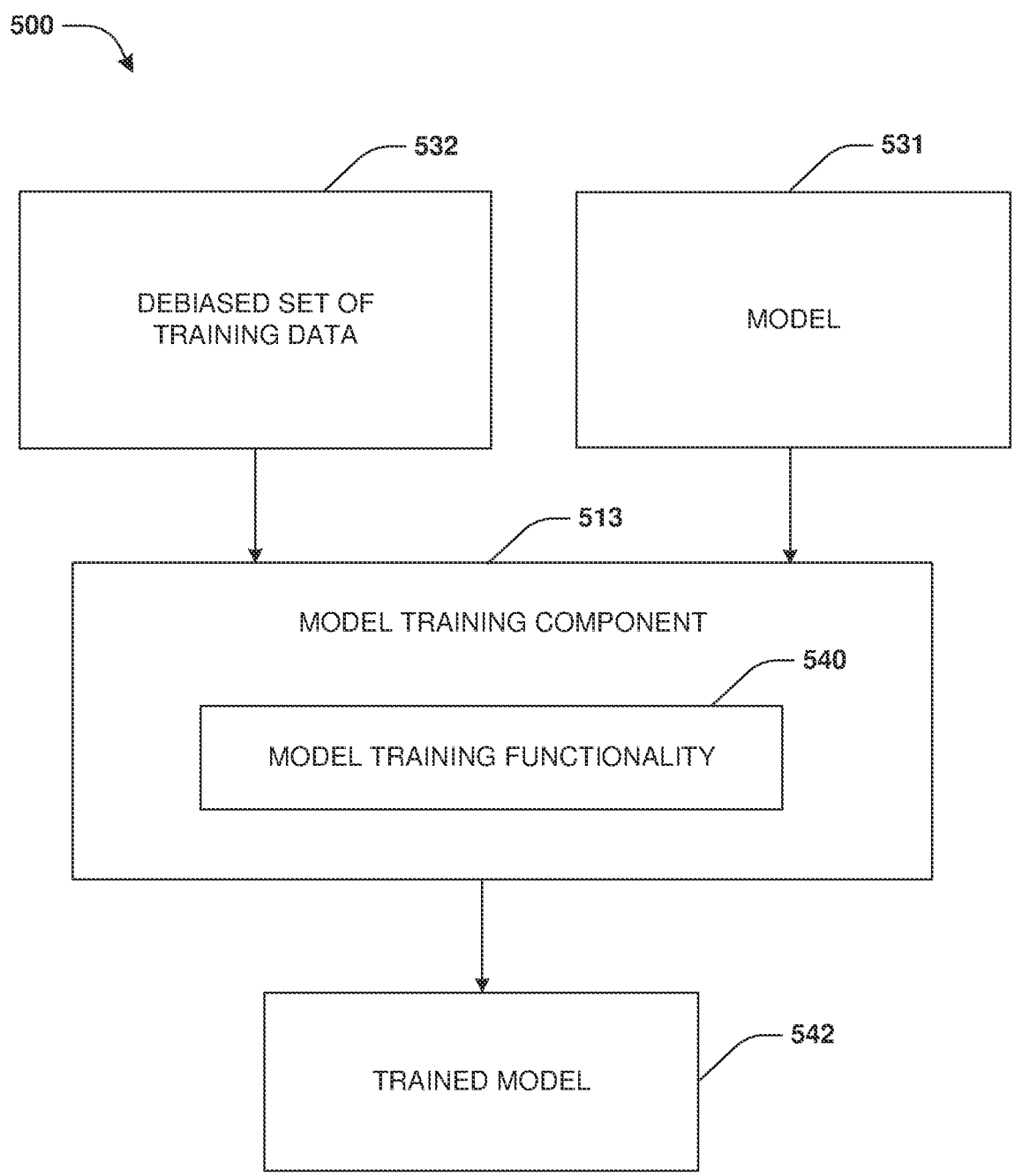
FIG. 5D is a component block diagram illustrating an example system for debiasing training data based upon information seeking behaviors, where a model is trained using a debiased set of training data.

During operation 408 of method 400, a model training component 513 may be configured to train a model 531 to create a trained model 542, as illustrated by FIG. 5D. In some embodiments, the model training component 513 may execute model training functionality 540 to train the model 531 to create the trained model 542. The model training component 513 may execute the model training functionality 540 to use the debiased set of training data 532 to train the model 531 as the trained model 542 to perform a task. In some embodiments, the task may correspond to determining how relevant content items are to users, and thus the model training component 513 may train the model 531 as the trained model 542 to output relevancy scores between content items and users. In some embodiments, the task may correspond to generating recommendations for users, determining what social network posts to display to users and what order to display the social network posts to the user, determining what media items (e.g., music, videos, images, videogames, etc.) to display to users and what order to display the media items to the user, modeling users, etc. In some embodiments, the model training component 513 executes the model training functionality 540 to train the model 531 using non-personalized information within the debiased set of training data 532, as opposed to personal information. This protects the privacy and security of the users.

Because the model training component 513 trains the model 531 using the debiased set of training data 532 that accounts for how position bias or other types of bias affect individual users or information seeking behavior groups 510 of users differently, the trained model 542 is more accurate at performing the task than if the model 531 was otherwise trained on the set of training data 502 that may not accurately reflect what content items were interesting to particular users because the position bias or other bias reduces the correlation of relevancy of content items to users. In this way, the trained model 542 can more accurately and/or precisely output relevancy scores for how relevant users will find content items because the trained model 542 was trained using the debiased set of training data 532 that more accurately reflects correlations of relevancy of content items to users because the position bias and/or other biases have been taken into account on an individual user basis and/or an information seeking behavior groups 510 of users basis.

Figure 5E:
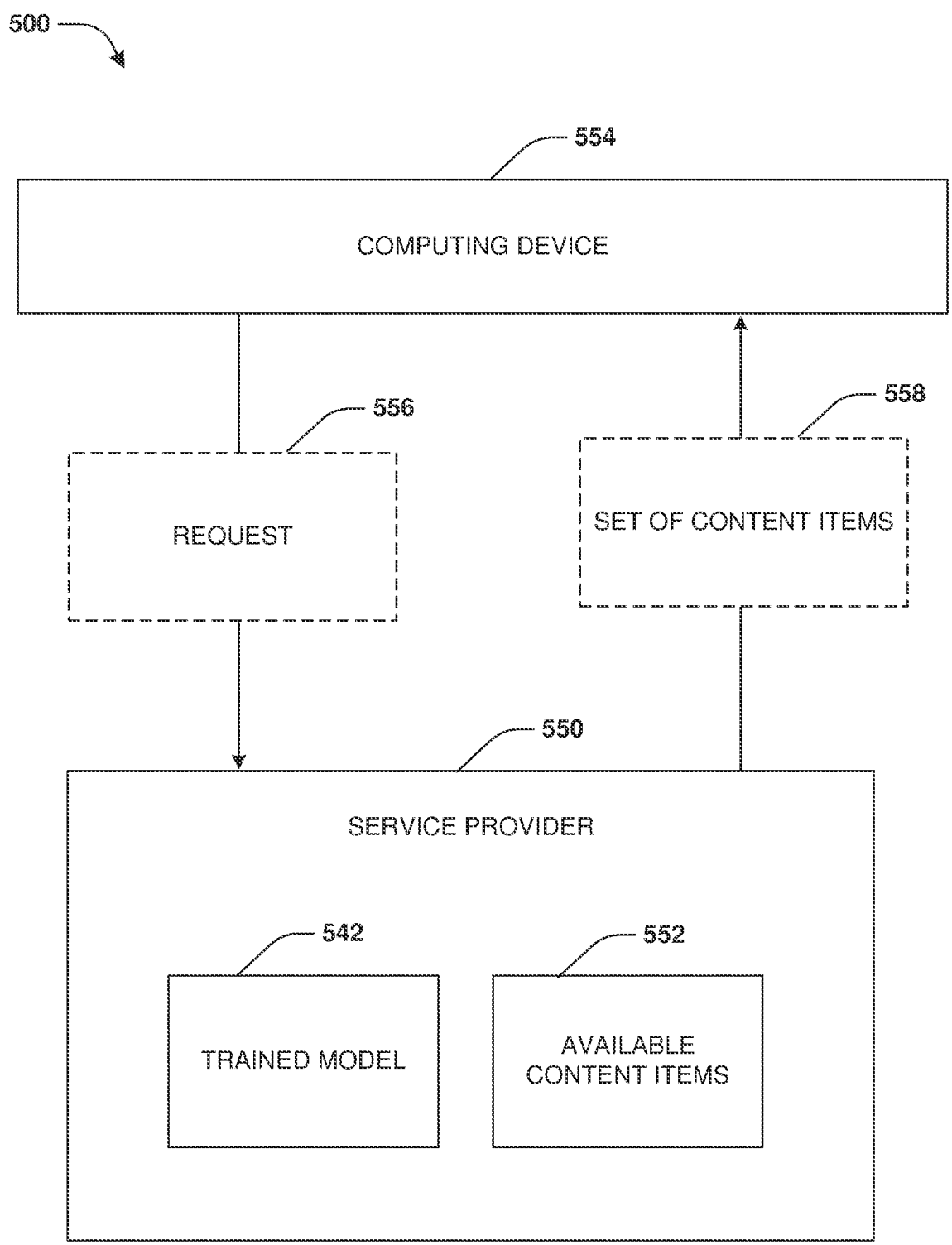
FIG. 5E is a component block diagram illustrating an example system for debiasing training data based upon information seeking behaviors, where a trained model is used to identify content items to provide to a computing device.

During operation 410 of method 400, a service provider 550 may implement the trained model 542 to perform a task, as illustrated by FIG. 5E. The service provider 550 may be configured to provide various types of services to computing devices, such as to computing device 554 of a user. For example, the service provider 550 may host a social network service, an email service, a website, a service that provides data to applications executing on remote computing devices, a news provider service, a content streaming service, a recommendation service, etc. The service provider 550 may utilize the trained model 542 to perform various tasks associated with such services, such as to identify what content items may be relevant to a particular user and how to display those content items to the user such as by assigning position locations to the content items (e.g., an ordering of display locations assigned to content items for display at the display locations corresponding to the order).

In some embodiments, the service provider 550 receives a request 556 from a computing devices 554 over a network. The request 556 may request the service provider 550 to perform a task, such as to identify content items that may be relevant to the user of the computing device 554 and/or to assign position locations to the content items for display through the computing device 554 to the user. The request 556 may comprise information about the user, which may be used to identify user features of the user (e.g., demographic information, interests of the user, browsing history of the user, search history of the user, purchase history of the user, etc.). The service provider 550 may have access to available content items 552. The available content items 552 may be associated with content features (e.g., a category or topic of a content item, what is depicted by an image, a genre of a movie or song, a topic of a new article, an author of a media content item, information about a product or service to recommend, etc.). The service provider 550 may execute the trained model 542 to evaluate the user features of the user and the content features of the available content items 552 is order to assign relevancy scores to the available content items 552. A relevancy score for a content may indicate how relevant the user may find the content item.

The service provider 550 may rank the available content items 552 based upon the relevancy scores assigned to the available content items 552. The service provider 550 may select a set of content items 558 based upon the ranks of the set of content items 558 (e.g., one or more content items that are ranked the highest may be selected as the set of content items 558). The service provider 550 may also use the ranks to assign position locations to the set of content items 558 (e.g., a highest ranked content item may be assigned to a most prominent/top position location for display, a next highest ranked content item may be assigned to a next most prominent/top position location for display, etc.). The service provider 550 may transmit the set of content items 558 and/or position locations to the computing device 554 for display to the user. In this way, the service provider 550 can utilize the trained model 542, trained using the debiased set of training data 532, to output highly accurate and precise relevancy scores for performing various tasks.

In some embodiments of debiasing training data for training models, an event (e.g., a user interacting with a content item that was displayed at a particular position) corresponds to a click (C), a relevance (R) of the content item to the user, an examination binary variable (E), and a user group categorical variable (Z). A click probability is conditioned based upon a user (u) with past behaviors (s), and on a content item (i) at position (k) is modeled as a combination of one or more types of probabilities. A first probability $P(Z=z|s)$ corresponds to an information seeking behavior group probability (e.g., a probability that the user belongs to a particular information seeking behavior group) condition on the past behaviors (s) corresponding to a set of last click positions of content items clicked by the user in past user sessions. This corresponds to how likely the user (u) with the past behaviors (s) belongs to each information seeking behavior group, and results in segmenting users. A second probability $P(E=1|k, z)$ corresponds to an examination probability conditioned on position (k) (e.g., a display location of a content item clicked by the user) and user group (z) (e.g., an information seeking behavior group of users), and corresponds to how likely the information seeking behavior group of users examines the position (k). This corresponds to stratified position bias estimation. A third probability $P(R=1|u, i)$ corresponds to a relevance probability condition of user (u) and content item (i), and relates to how likely the content item (i) is relevant to the user (u). This corresponds to position-debiased relevance model estimation. In this way, the click probability may be based upon one or more of these three probabilities and/or other probabilities. In some embodiments, these probabilities are estimated using an Expectation-Maximization method from user implicit feedback with a predefined number of user groups (e.g., information seeking behavior groups).

In some embodiments, user (A) is more active than user (B) at seeking information. User (A) and user (B) have last click positions in the past user sessions of positions {7, 10, 8} for user (A) and positions {1, 3} for user (B), and thus user (A) clicked content items at positions 7, 10, and 8 in the past three user sessions, and user (B) clicked content items at positions 1 and 3 in the past two user sessions. In an example, user (A) has higher segmentation probabilities on a first group and a last group, and user (B) has higher segmentations probabilities on a second group and a third group, where a group corresponds to an information seeking behavior group. A global position bias $p(E=1|k)$ is decomposed into four stratified position biases, $p(E=1|k,z)$, while considering user group assignments (e.g., assignments of users to information seeking behavior group) based on $P(Z=z|s)$ during an iterative EM optimization process. Implicit feedback from user (A) will affect the estimate $P(E=1|k, z=1)$ and $P(E=1|k, z=4)$ more than $P(E=1|k, z=2)$ and $P(E=1|k, z=3)$, and vice versa for user (B).

In an example, the optimized $p(E=1|k,z)$ may indicate that the third group is highly likely to examine a top position's content item whereas the first group has similar examination probabilities across positions. With the weighted summation of $P(Z=z|s)$ and $P(E=1|k, z)$, different position biases are obtained depending on user characteristics towards information seeking. In particular, user (A) has relatively even biases across positions compared to user (B). Thus, an inference can be made that given three unclicked content items {3, 10, 11} in a current user session, user (A) is likely to examine all three content items, and skip content items because they are not relevant to user (A). In other words, all skipped items for user (A) can be confidently used as negative examples for relevance modeling and model training. However, user (B) is less likely to examine unclicked content items at lower/less prominent positions even though the unclicked content items could be relevant to user (B). Therefore, the unclicked content items (e.g., a content item at position 11) for user (B) cannot be confidently used as negative examples for relevance modeling and model training. This improves the ability to better debias implicit user feedback compared to merely considering a single global position bias on all feedback. In this way, a more accurate relevance model as a ranking function is generated. This generated ranking function does not require items' positions and users' history during the inference time as indicated by $P(R|u,i)$. In other words, the ranking function only requires the current user preference (user features) and content item property (content features) to generate a ranking list of content items, and thus it can be also easily deployed in production.

Figure 6:
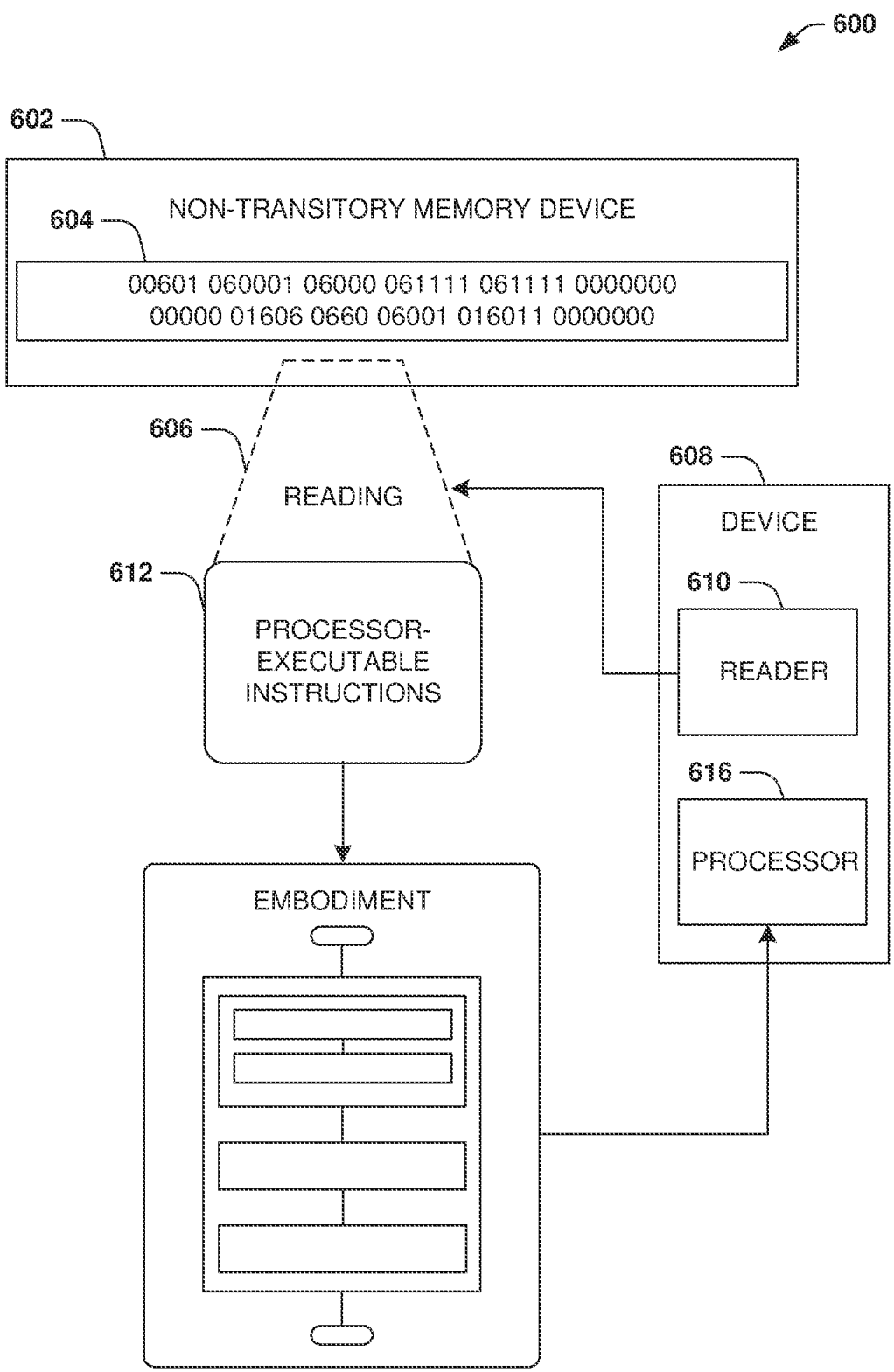
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed cause performance of operations, such as at least some of the example method 400 of FIG. 4, for example. In some embodiments, the processor-executable instructions 612 are configured to cause implementation of a system, such as at least some of the example system 500 of FIG. 5A-5E, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   executing, on a processor of a computing device, instructions that cause the computing device to perform operations, the operations comprising:
      segmenting users associated with a set of training data into information seeking behavior groups that each correspond to a degree of information seeking behavior, wherein the information seeking behavior groups comprise (i) a first information seeking behavior group of first users associated with a first amount of information seeking behavior indicative of browsing more than a threshold amount of content items before interacting with a first content item and (ii) a second information seeking behavior group of second users associated with a second amount of information seeking behavior indicative of browsing less than the threshold amount of content items before interacting with a second content item;
      estimating position biases for the information seeking behavior groups based upon information seeking behaviors of users within the information seeking behavior groups, wherein the estimating comprises identifying a first position bias for the first information seeking behavior group of the first users associated with the first amount of information seeking behavior and identifying a second position bias for the second information seeking behavior group of the second users associated with the second amount of information seeking behavior;
      debiasing the set of training data using the position biases, comprising the first position bias for the first information seeking behavior group of the first users associated with the first amount of information seeking behavior and the second position bias for the second information seeking behavior group of the second users associated with the second amount of information seeking behavior, to generate a debiased set of training data; and
      training a model using the debiased set of training data to generate a trained model, wherein the trained model is configured to output relevancy scores, between content items and the users, that account for the position biases estimated for the information seeking behavior groups.

2. The method of claim 1, wherein the trained model is configured to perform a task.

3. The method of claim 2, comprising:
   receiving a request to perform the task; and
   executing the trained model to perform the task to generate an output provided in response to the request.

4. The method of claim 1, comprising:
   determining segmentation probabilities that the users belong to the information seeking behavior groups.

5. The method of claim 4, comprising:
   determining personalized position biases for the users based upon the segmentation probabilities; and
   debiasing the set of training data based upon the personalized position biases.

6. The method of claim 1, wherein the training set of data comprises implicit user feedback corresponding to whether users interacted with content items and how the users interacted with the content items.

7. The method of claim 1, wherein the segmenting comprises:
   evaluating click positions of content items interacted with by a user during a user session.

8. The method of claim 1, comprising:
receiving a request from a second computing device for a set of content items to display on the second computing device;
utilizing the trained model to output a set of relevancy scores for available content items;
ranking the available content items based upon the set of relevancy scores; and
transmitting one or more available content items selected based upon ranks assigned to the one or more available content items to the second computing device as the set of content items.

9. A non-transitory machine readable medium having stored thereon processor-executable instructions that when executed cause performance of operations, the operations comprising:
segmenting users associated with a set of training data into information seeking behavior groups that each correspond to a degree of information seeking behavior, wherein the information seeking behavior groups comprise (i) a first information seeking behavior group of first users associated with a first amount of information seeking behavior indicative of browsing more than a threshold amount of content items before interacting with a first content item and (ii) a second information seeking behavior group of second users associated with a second amount of information seeking behavior indicative of browsing less than the threshold amount of content items before interacting with a second content item;
estimating biases for the information seeking behavior groups based upon information seeking behaviors of users within the information seeking behavior groups, wherein the estimating comprises identifying a first bias for the first information seeking behavior group of the first users associated with the first amount of information seeking behavior and identifying a second bias for the second information seeking behavior group of the second users associated with the second amount of information seeking behavior;
debiasing the set of training data based upon the biases, comprising the first bias for the first information seeking behavior group of the first users associated with the first amount of information seeking behavior and the second bias for the second information seeking behavior group of the second users associated with the second amount of information seeking behavior, to generate a debiased set of training data; and
training a model using the debiased set of training data to generate a trained model, wherein the trained model is configured to output relevancy scores between content items and the users.

10. The non-transitory machine readable medium of claim 9, wherein the biases comprise a presentation bias.

11. The non-transitory machine readable medium of claim 9, wherein the biases comprise at least one of a prejudice bias, a measurement bias, a sample bias, an exclusion bias, an observer bias, or a position bias.

12. The non-transitory machine readable medium of claim 9, wherein the operations comprise:
receiving a request from a computing device for a set of content items to display on the computing device;
utilizing the trained model to output a set of relevancy scores for available content items;
ranking the available content items based upon the set of relevancy scores; and
transmitting one or more available content items selected based upon ranks assigned to the one or more available content items to the computing device as the set of content items.

13. The non-transitory machine readable medium of claim 12, wherein the operations comprise:
assigning position locations to the set of content items based upon the ranks.

14. The non-transitory machine readable medium of claim 9, wherein the operations comprise:
evaluating information seeking behavior of a user during a user session.

15. A computing device comprising:
a processor; and
memory comprising processor-executable instructions that when executed by the processor cause performance of operations, the operations comprising:
segmenting users associated with a set of training data into information seeking behavior groups that each correspond to a degree of information seeking behavior, wherein the information seeking behavior groups comprise (i) a first information seeking behavior group of first users associated with a first amount of information seeking behavior indicative of browsing more than a threshold amount of content items before interacting with a first content item and (ii) a second information seeking behavior group of second users associated with a second amount of information seeking behavior indicative of browsing less than the threshold amount of content items before interacting with a second content item;
estimating biases for the information seeking behavior groups based upon information seeking behaviors of users within the information seeking behavior groups, wherein the estimating comprises identifying a first bias for the first information seeking behavior group of the first users associated with the first amount of information seeking behavior and identifying a second bias for the second information seeking behavior group of the second users associated with the second amount of information seeking behavior;
debiasing the set of training data based upon the biases, comprising the first bias for the first information seeking behavior group of the first users associated with the first amount of information seeking behavior and the second bias for the second information seeking behavior group of the second users associated with the second amount of information seeking behavior, to generate a debiased set of training data; and
training a model using the debiased set of training data to generate a trained model, wherein the trained model is configured to perform a task.

16. The computing device of claim 15, wherein the task corresponds to recommending content items to a user.

17. The computing device of claim 15, wherein the task corresponds to user modeling of a set of users.

18. The computing device of claim 15, wherein the model is trained using non-personalized information within the debiased training set of data.

19. The computing device of claim 15, wherein the operations comprise:
receiving a request to perform the task; and
executing the trained model to perform the task to generate an output provided in response to the request.

20. The computing device of claim 15, wherein the task corresponds to determining relevancy of a content item to a user.

* * * * *